United States Patent [19]
McMillen

[11] 3,839,899
[45] Oct. 8, 1974

[54] METHOD AND APPARATUS FOR DETERMINING PARAMETERS OF CORE SAMPLES

[75] Inventor: James M. McMillen, Arlington, Tex.

[73] Assignee: Mobil Oil Corporation, New York, N.Y.

[22] Filed: Sept. 24, 1971

[21] Appl. No.: 183,389

[52] U.S. Cl............... 73/38, 33/DIG. 2, 33/147 N, 33/174 L
[51] Int. Cl........................ G01b 13/02, G01m 3/02
[58] Field of Search ........... 73/38, 37.5, 37.6, 37.8, 73/419, 88 E, 84, 94, 88 R; 324/13, 14; 338/39; 33/147 N, 174 L, DIG. 2

[56] References Cited
UNITED STATES PATENTS

| | | | |
|---|---|---|---|
| 2,448,955 | 9/1948 | Bruce | 73/38 |
| 1,851,978 | 4/1932 | Dinger | 338/39 X |
| 2,612,037 | 9/1952 | Van Rooy | 73/37.5 |
| 2,821,680 | 1/1958 | Slusser et al. | 324/13 |
| 2,786,109 | 3/1957 | Esken | 73/37.5 X |
| 3,505,860 | 4/1970 | Bishop et al | 73/94 |
| 3,457,778 | 6/1966 | Gill et al. | 73/88 E X |
| 3,616,685 | 11/1971 | Strom | 73/94 |
| 3,216,242 | 11/1965 | Eyrich | 73/94 |
| 3,162,037 | 12/1964 | Hurst | 73/38 |

FOREIGN PATENTS OR APPLICATIONS

| | | | |
|---|---|---|---|
| 1,470,372 | 2/1967 | France | 73/38 |

Primary Examiner—Richard C. Queisser
Assistant Examiner—Daniel M. Yasich
Attorney, Agent, or Firm—A. L. Gaboriault; Drude Faulconer

[57] ABSTRACT

Apparatus and method for determining the length, diameter, porosity, and permeability of a core sample in a single handling operation. A cell is provided which receives the core and holds same during the measurement operation. A plug which is slidably mounted in the cell moves into contact with the core in the cell and at the same time operates a linear potentiometer to measure the length of the core. The cell has an elastic sleeve which is expanded into contact with the core by fluid pumped into the cell behind the sleeve. The exact amount of fluid required to raise the pressure behind the sleeve to a predetermined value is measured and, from a defined relationship, the average diameter of the core is determined. The core receiving portion of the cell is then pressured with gas after which the gas is allowed to expand into a chamber of known volume. From pressure data during this operation, the porosity of the core is determined. The core receiving portion of the cell is then vented and from the time required for the pressure therein to reduce by one half, the permeability of the core is determined.

10 Claims, 2 Drawing Figures

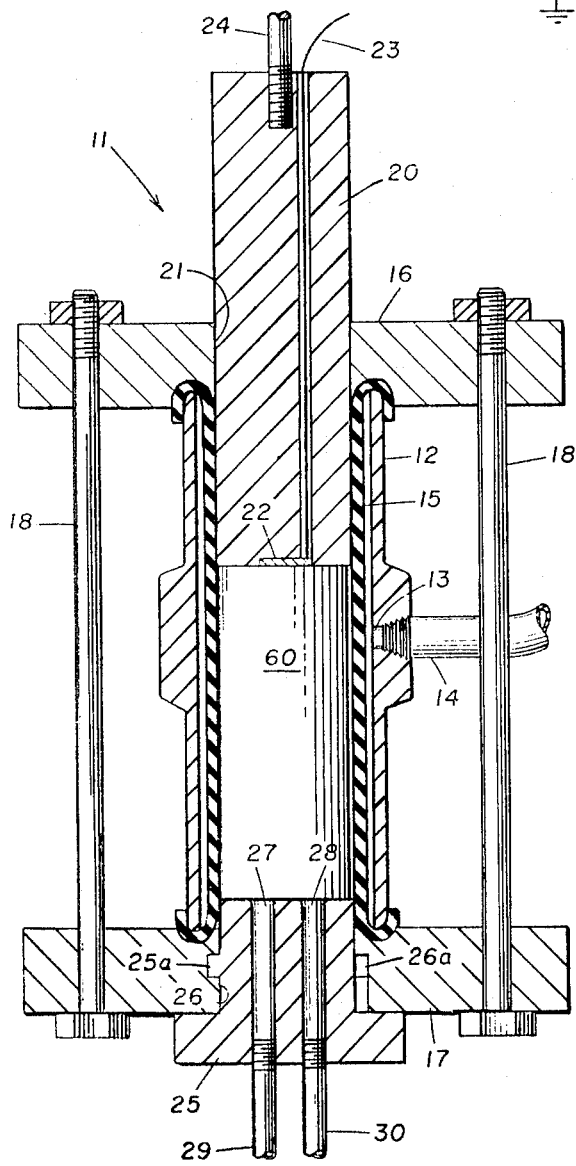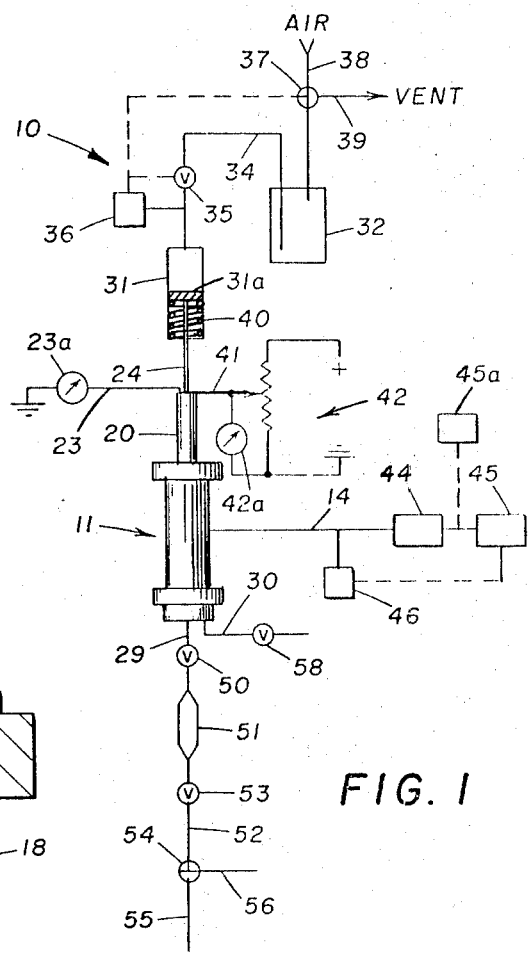
FIG. 2
FIG. 1

METHOD AND APPARATUS FOR DETERMINING PARAMETERS OF CORE SAMPLES

BACKGROUND OF THE INVENTION

This invention relates to a method and apparatus for determining certain lithological characteristics of a material and more particularly relates to a method and apparatus for determining the length, diameter, permeability, and porosity of a core sample taken from a mineral producing reservoir.

In the production of minerals, e.g., oil and gas, it is common to "engineer" the producing reservoir to improve the economic performance thereof. To do this, certain lithological properties of the reservoir must be determined. The two most important of these properties are the permeability and the porosity of the reservoir rock in which the oil and gas are stored. Permeability is a measure of the ability of a material to transmit fluids through pore spaces of the material and is inversely proportional to the flow resistance offered by the material. Porosity of a material is defined as the ratio of the aggregate volume of its void or pore spaces to its gross bulk volume and in the case of an oil reservoir, porosity is a measure of the capacity within the reservoir rock which is available for storing oil and gas.

Normally, porosity and permeability of a reservoir rock are determined by taking core samples from the reservoir and then carrying out well-defined measurement techniques on these cores. There are several techniques available for accurately determining the porosity and permeability of core samples, many of which are described on pages 660–669, PETROLEUM PRODUCTION ENGINEERING — DEVELOPMENT by L. C. Uren, Fourth Edition, McGraw-Hill Book Company, Inc., 1956.

In known prior art techniques, however, an operator first has to tediously measure the length and diameter of each core sample and then perform separate operations on the core to determine the porosity and permeability. This procedure requires substantial time on the part of a skilled operator. Therefore, it can be seen that any reduction in the time spent in making the above-mentioned measurements on a single core becomes even more economically significant when such measurements must be made on a large number of cores.

SUMMARY OF THE INVENTION

The present invention provides a method and an apparatus for quickly determining certain lithological properties of a material. Specifically, the present invention provides a method and an apparatus which can measure the length, diameter, permeability, and porosity of a core sample taken from a mineral producing reservoir in a single handling operation.

Structurally, the apparatus has a cell which is adapted to receive a cylindrical core sample through one end thereof. A plug having a quick locking/releasing means thereon is used to seal the receiving end of the cell once the core is in place. A sliding plug is positioned in the other end of the cell and is adapted to be moved into contact with the core by means of a hydraulically actuated piston. The upper part of the sliding plug carries an actuator for a linear potentiometer which is calibrated to define the length of the core depending on how far the sliding plug moves into the cell.

The cell has an elastic sleeve therein which loosely surrounds the core when the core is first inserted into the cell. With the sliding plug still in contact with the core, fluid is supplied behind the sleeve to expand it into contact with the core. The amount of fluid required to reach a predetermined pressure behind the sleeve within the cell is carefully measured and from known relationships, the diameter of the core is determined.

A pressure transducer is provided on the sliding plug adjacent its contact with the core so that the pressure at that point can be monitored. A special, calibrated chamber communicates with the interior of the cell through a valved passage in the plug in the receiving end of the cell. Air is admitted to the core while in the cell until a measurable, equalized pressure is reached therein. The valved passage is then opened and the air in the cell and hence the core is allowed to expand into the calibrated chamber. The pressure within the cell is then determined and through a defined relationship, the porosity of the core is determined.

The cell is then vented and the time required for the pressure to reach a predetermined value is recorded. From this data and the initial and final pressures involved, the permeability of the core is determined.

It should be recognized that the entire operation can be automated so that once the core has been positioned and the apparatus actuated, the proper sequence of operation is carried out. Further, the various measured parameters, e.g., length, pressures, etc., can be encoded directly into an electronic computer so all calculations are quickly carried out with the final results being printed out in desired form.

BRIEF DESCRIPTION OF THE DRAWINGS

The actual construction, operation, and the apparent advantages of the present invention will be better understood by referring to the drawings in which like numerals identify like parts and in which:

FIG. 1 is a schematic view of the apparatus of the present invention; and

FIG. 2 is a sectional view of the core receiving cell of the present invention.

DESCRIPTION OF THE PREFERRED EMBODIMENT

Referring more particularly to the drawings, FIG. 1 shows a schematic view of apparatus 10 which is capable of determining the length, diameter, permeability, and porosity of a core sample in a single handling operation.

At the heart of apparatus 10 is cell 11 which receives and holds the core sample during the measurement operation. As seen in FIG. 2, cell 11 is comprised of a housing 12 which has an opening 13 through the wall thereof which, in turn, is adapted to be coupled to a fluid supply line 14. An elastic sleeve 15 is positioned within housing 12 and is held in place by upper and lower plates 16, 17, respectively, which in turn are coupled together by bolts 18.

Upper plug 20 is slidably mounted through opening 21 in upper plate 16 and carries, at its lower end, a pressure transducer 22 having a signal output line 23 connected to readout means 23a. Transducer 22 can be of any type that senses pressure and emits a signal representative of said pressure, e.g., a strain-gauge bridge type of pressure transducer, such as Pressure Sensor Model YQL-250-10, manufactured by Kulite Semiconductor Products, Inc., of Ridgefield, New Mersey.

Attached to the upper end of slidable plug 20 is a piston rod 24, the purpose of which will become evident below.

Lower plug 25 fits into and seals receiving opening 26 through plate 17. A quick-locking/release means, e.g., lug 25a on plug 25 which cooperates with groove 26a in opening 26, is provided on plug 25 so that it can be easily and quickly secured and removed from opening 26. This type of locking/release means allows plug 24 to be locked or released by only turning the plug a quarter of a turn or so. Plug 25 has passages 27, 28 therethrough to which lines 29, 30, respectively, are attached.

Referring again to FIG. 1, piston rod 24 extends from plug 20 into drive cylinder 31 and is attached to piston 31a. Fluid, e.g., oil, is supplied from reservoir 32 to cylinder 31 through line 34. Valve 35 and pressure-sensitive switch 36 are positioned within line 34 between cylinder 31 and reservoir 32. Three-way valve 37 when in one position allows gas, e.g., air, to flow into reservoir 32 through line 38 and when in a second position allows reservoir 32 to be vented through line 39. A constant-rate, return spring means 40 is provided to normally bias piston 31a toward an up position.

Also carried by plug 20 is actuator arm 41 which operates linear potentiometer 42 (shown schematically) for a purpose described below. Potentiometer 42 has a readout means 42a attached thereto. Supply line 14 is connected to pump means 44 which is operated by motor 45. Pump means 44 is of the type which allows accurate measurement of the amount of fluid pumped, e.g., a screw-feed, positive-displacement pump which has a capacity forward of its displacement piston sufficient to store the volume of noncompressible fluid necessary for use in the present invention. This negates the need for a separate fluid reservoir as is well understood by those skilled in the art although such a reservoir could be easily provided. Motor 45 is preferably of the type commonly referred to as a stepping motor so that it moves pump means 44 in discrete increments. A counter 45a, which records the number of steps of motor 45, is provided. Pressure-sensitive switch 46 is connected into supply line 14 for a purpose explained below.

Line 28, which is attached to passage 27 through plug 25, is connected through valve 50 to one end of calibrated volume chamber 51. Line 52 is connected to the other end of chamber 51 and includes valves 53, 54. Valve 54 is a three-way valve to which pressure line 55 and vent line 56 are connected. Valve 58 is included in vent line 57 which in turn is attached to opening 28 in plug 25.

Operation of apparatus 10 and the method carried out thereby are as follows. Reservoir 32 is sufficiently filled with oil and is pressurized by air supplied through line 38. A cylindrical core sample 60 (FIG. 2) on which the desired measurements are to be made in positioned in cell 11 through opening 26 in plate 17 and lower plug 25 is inserted into opening 26 and locked in place. Valve 35 is opened, allowing oil to flow from reservoir 32 into cylinder 31. Piston 31a drives upper plug 20 downward until it reaches top of core 60. Pressure switch 36 is set to remain open while piston 31a is moving but when piston 31a stops, the pressure in line 34 builds up to the set point of the switch, closing switch 36 which in turn closes valve 35 to thereby lock plug 20 against core 60. The oil is preferably of a relatively high viscosity and the pressure drop in line 34 is enough to keep the pressure from being maximum until piston 31a comes to a stop. Actuator arm 41, as it is carried downward by plug 20, operates linear potentiometer 42 whose previously calibrated output is proportional to the length of core 60. The final output reading of potentiometer 42 provides an accurate measurement of the length of core 60.

After plug 20 comes to rest and valve 35 has closed to lock plug 20 in place, valve 37 is moved to vent the pressure from reservoir 32 through line 39. Next, stepping motor 45 is actuated to drive pump 44 to force noncompressible fluid through line 14 into cell 11 to expand sleeve 15 against core 60. Switch 46 in line 14 is set to shut off motor 45 when a preset pressure has been reached. By counting the number of motor steps and knowing the corresponding displacement of pump 44 for each step, the exact amount of fluid which is necessary to reach the preset pressure can be determined. From this data, the average diameter and hence the average cross-sectional area of the core can be calculated in accordance with the following relationship.

$$D_c = \sqrt{D_p^2 + (\pi/4L)(V_1 - V_2)} \qquad 1$$

wherein:
- $D_c$ = average diameter of core 60 in centimeters;
- $D_p$ = diameter of plug 20 in centimeters;
- $L$ = length of core 60 in centimeters;
- $V_1$ = volume of fluid required to reach predetermined pressure when plug 20 completely fills cell 11 in centimeters;
- $V_2 = V_s N_s$
- $V_s$ = volume of fluid per step of motor 45;
- $N_s$ = number of steps of motor 45 to reach predetermined pressure when core 60 is in place.

The average cross-sectional area is, of course, equal to $\pi D_c^2/4$.

The next step in the operation is to determine the porosity of core 60. To do this, valve 58 is closed, valves 50 and 53 are opened, and valve 54 is vented to the atmosphere. Valve 54 is then positioned so that air under pressure flows from line 55, through valve 53, calibrated volume chamber 51, valve 50, and into core 60 within cell 11. The output of pressure transducer 22 is monitored during this step. The pressure of the air being initially applied to the lower end of the core is preferably low, e.g., between 6 and 7 psi. When transducer 22 output reaches a predetermined pressure (e.g., 4.1 psi under above conditions) valve 50 is closed to cut off the air. This allows the pressure at transducer 22 to equilibrate more quickly than if air is supplied continuously. When the pressure equalizes, this pressure $P_1$ is noted and recorded for later use in the calculation of the pore volume.

Calibrated volume chamber 51 is then vented to the atmosphere through valve 54 and valve 53 is closed. Valve 50 is opened and the air in core 60 and that in the space below the core, valve 50, and line 28, expands into calibrated volume chamber 51. The pressure starts to drop and when the pressure $P_2$ reaches equilibrium, it is noted and recorded. By using the following relationship, the pore volume in the core can be calculated.

$$P_1 V_1 = P_2 V_2 \qquad 2.$$

wherein:
- $P_1$ = pressure within cell 60 before opening valve 58;

$V_1 = V_p + V_x$;

$P_2$ = pressure within cell 60 after opening valve 58;

$V_2 = V_p + V_x + V_c$;

$V_p$ = pore volume in core;

$V_x$ = excess volume between bottom of core and valve 58;

$V_c$ = volume of calibrated chamber 51.

By substitution and simplification, pour volume $V_p$ can be expressed as:

$$V_p = [P_2(V_s + V_c) - P_1 V_s]/(P_1 - P_2) \qquad 3.$$

By using standard plugs of known pore volume, $V_x$ can be calculated and will be a constant. Since, at the conclusion of the above-described operation, all variables will be known except $V_p$, it can easily be calculated from equation (3). Porosity $\Phi$ is equal to the pore volume ($V_p$) of a core divided by its bulk volume ($V_B$). The length and cross-sectional area of core 60 have been already determined so $V_B$ is easily calculated and is divided into $V_p$ to obtain the porosity $\Phi$ of the core.

Next, the permeability K of core 60 is determined. Valve 50 is closed and valve 58 is opened. The time at which this takes place is recorded. The output of transducer 22 is continuously monitored and when the pressure reaches one half of the previous equilibrium pressure $P_2$, the time is again recorded. The difference in time is called the half time (T).

The permeability K is then calculated by applying the following relationship:

$$K = (535.5 \, \Phi L^2)/[T(P_B + \Delta P/2)] \qquad 4.$$

wherein:

$K$ = the permeability in millidarcies;

$\Phi$ = the porosity previously calculated;

$L$ = the length of the core in centimeters;

$T$ = the half time, as described above, in seconds;

$P_B$ = the barometric (atmospheric) pressure in centimeters of mercury;

$\Delta P$ = the difference between the previous equillibrium pressure $P_2$ and the barometric pressure in centimeters of mercury.

535.5 = a constant determined by the air viscosity (about 0.0183 centipoise), a theoretically determined and experimentally checked value of 0.385, and conversion constants from the theoretical and experimental units to the units noted above. In that work, K was in cm², P in dynes/cm², and air viscosity in poise.

After the half time has been measured, the pump 44 and upper end plug 20 are returned to their original positions and core 60 removed.

As an additional feature of the present invention, apparatus 10 is capable of determining when the permeability of a particular core is so tight that an undue time would be required to measure same. This determination is made as follows. As sleeve 15 is initially pressed against the core, some pressure will be built up in the core. A core which has a high permeability will show some momentary pressure as detected by transducer 22. A tight core will show a pressure increase which drops off slowly, and a core which has a tight or, essentially, no permeability will show a pressure increase which remains high for a considerable period of time. If transducer 22 output is monitored and the time required for this pressure to drop below some predetermined value is measured, it can be determined whether the core is going to be too tight to measure. If it is too tight to measure, that is, if the measurement would take so long that it would be impractical to carry out, then the pump 44 and upper plug 20 are returned to their initial positions and the core removed. By recording the maximum pressure reached, and the fraction of this value that the pressure drops in the predetermined time, it is possible to determine the approximate permeability. This is done by using cores of known permeability and porosity for calibration by determining what fraction of the maximum pressure is lost in the predetermined time. In such case, the porosity of the unknown core must be estimated. This can be done with sufficient accuracy for most purposes by persons skilled in core measuring techniques.

For the sake of brevity, various automatic control means and the necessary wiring which may be provided for apparatus 10, if desired, have not been shown. As understood by those skilled in the art, these means would provide for automatically opening and closing valves in proper sequence and with proper timing, starting, stopping, and reversing motor 45, etc., so that the entire operation can be carried out automatically once a core is positioned in cell 11. The actual control can be effected by a properly programed computer which will issue the proper commands to solenoid valves, etc., in the desired time sequence. Further, the same computer may be programed to accept the various readouts from apparatus 10 (e.g., length), store same, and retrieve same when required to make subsequent calculations, e.g., core diameter, cross-sectional area of core, porosity, and permeability. For example, any computer capable of issuing real time commands may be used, e.g., IBM Model 1800, or as preferred, a computer from the class of "minicomputers" may be used, e.g., Redcor Model 70 programed in accordance with CyberLogic. CyberLogic is a higher order programing language and is discussed in the article "CyberLogic - A New System for Computer Control" by Trimble et al., AFIPS Conference Proceedings, Vol. 37, 1970, Fall Joint Computer Conference, November 17-19, 1970, Houston, Texas, AFIPS Press of Montvale, New Jersey. This allows an operator to merely insert a core into cell 11, start the operation, and sit back and wait for the computer to print out all the measured parameters in a desired format. Still further, from the above measurements the computer could print out additional information, e.g., bulk volume, pore volume, etc. If apparatus is automated as disclosed, the time required for loading cell 11 with a core sample, measuring and printing out the desired parameters of said core, and resetting apparatus 10 for receiving the next sample is on the order of 45 seconds for a core of about 7.5 cm. length, 20 percent porosity, and 500 md. permeability.

What I claim is:

1. An apparatus for measuring certain parameters of a substantially cylindrical sample of material comprising:

a cell comprising a housing having a first and a second end, said first end having an opening through which said sample is received;

removable means for sealing said opening in said first end;

means slidably and sealingly positioned through an opening in said second end of said cell and adapted to be moved into contact with said sample when said sample is in place within said cell;

means actuated by said slidable means for determining the length of said sample;

a means within said cell at the point where said slidable means contacts said sample for monitoring the pressure at said point;

an elastic sleeve within said cell completely surrounding said sample when said sample is in place;

means for supplying fluid to said cell behind said sleeve to expand the sleeve into a contact with said sample;

means for ceasing fluid flow behind said sleeve when pressure behind said sleeve reaches a predetermined pressure; and means for measuring the amount of fluid required to reach said predetermined pressure.

2. The apparatus of claim 1 wherein said means actuated by said slidable means comprises:

a linear potentiometer.

3. The apparatus of claim 1 including:

means for supplying fluid to said sample while said sample is in said cell;

a chamber fluidly connected to the sample-receiving portion of said cell, said chamber being of known volume; and valve means positioned in the fluid path between said cell and said chamber, said valve means when in an open position allowing fluid flow between said sample-receiving portion of said cell and said chamber.

4. The apparatus of claim 3 including:

means to vent the sample-receiving portion of said cell.

5. The apparatus of claim 4 including:

means for moving said slidable means into and out of contact with said sample of material.

6. The apparatus of claim 5 wherein said means for moving said slidable means comprises:

a hydraulically actuated piston connected to said slidable means.

7. The apparatus of claim 5 wherein said means for monitoring said pressure within said cell comprises:

a pressure transducer carried by said slidable means.

8. A method for determining certain parameters for a substantially cylindrical sample of material comprising:

placing said sample in a cell having an elastic sleeve which surrounds said sample;

measuring the length of said sample while said sample is in said cell;

supplying fluid to said cell behind said sleeve to expand said sleeve into contact with said sample and measuring the amount of fluid required to reach a predetermined pressure;

ceasing the supply of fluid when the pressure behind said sleeve reaches said predetermined pressure; and determining the average diameter $D_c$ of said sample in accordance with the following relationship;

$$D_c = \sqrt{D_p^2 + (\pi/4L)(V_1 - V_2)}$$

wherein:

$D_p$ = diameter of known plug used to calibrate cell in centimeters;

$L$ = length of sample in centimeters;

$V_1$ = volume of fluid required to reach said predetermined pressure when known plug is present in cell in centimeters;

$V_2$ = volume of fluid required to reach said predetermined pressure when sample is in cell in centimeters.

9. The method of claim 8 including:

supplying gas to said sample in said cell until a desired pressure $P_1$ is reached;

allowing said gas to expand from said cell into a chamber having a known volume $V_c$;

measuring the pressure $P_2$ in the cell after gas has expanded; and determining the porosity $\Phi$ of said sample from the following relationships:

$$\Phi = V_p/V_B$$

wherein $V_p$ = pore volume of sample = $[P_2 (V_x = V_c) - P_1 V_x]/[P_1 - P_2]$;

$V_x$ = excess volume between cell and chamber; and $V_B$ = bulk volume of sample.

10. The method of claim 9 including:

venting said cell after the porosity of the material has been determined;

determining the time (T) that is required for the pressure $P_2$ in said cell to decrease to one half its value; and determining the permeability K of said sample in accordance with the following relationship:

$$K = [535.5 \, \Phi \, L]/[T(P_B + \Delta P/2)]$$

wherein:

$\Phi$ = porosity of sample in milidarcies;

$L$ = length of sample in centimeters;

$T$ = half time in seconds;

$P_B$ = barometric pressure in centimeters of mercury;

$\Delta P$ = difference between $P_2$ and $P_B$; and 535.5 = a constant determined by the air viscosity (about 0.0183 centipoise), a theoretically determined and experimentally checked value of 0.385, and conversion constants from the theoretical and experimental units to the units noted above. In that work, K was in cm², P in dynes/cm², and air viscosity in poise.

* * * * *